(12) United States Patent
Jannerstad

(10) Patent No.: US 12,240,003 B2
(45) Date of Patent: Mar. 4, 2025

(54) CENTRIFUGAL SEPARATOR AND MACHINE COMPRISING A CENTRIFUGAL SEPARATOR

(71) Applicant: Alfdex AB, Landskrona (SE)

(72) Inventor: Ronny Jannerstad, Fjärdhundra (SE)

(73) Assignee: ALFDEX AB, Landskrona (SE)

( * ) Notice: Subject to any disclaimer, the term of this patent is extended or adjusted under 35 U.S.C. 154(b) by 492 days.

(21) Appl. No.: 17/776,066

(22) PCT Filed: Dec. 3, 2020

(86) PCT No.: PCT/EP2020/084517
§ 371 (c)(1),
(2) Date: May 11, 2022

(87) PCT Pub. No.: WO2021/122042
PCT Pub. Date: Jun. 24, 2021

(65) Prior Publication Data
US 2022/0388015 A1 Dec. 8, 2022

(30) Foreign Application Priority Data

Dec. 16, 2019 (EP) .................... 19216527

(51) Int. Cl.
*B04B 5/12* (2006.01)
*B01D 45/14* (2006.01)
(Continued)

(52) U.S. Cl.
CPC ............... *B04B 5/12* (2013.01); *B01D 45/14* (2013.01); *B04B 9/06* (2013.01); *F01M 13/04* (2013.01)

(58) Field of Classification Search
CPC ....... B04B 5/12; B04B 9/06; B04B 2005/125; B01D 45/14; F01M 13/04; F01M 2013/0422
(Continued)

(56) References Cited

U.S. PATENT DOCUMENTS

| | | |
|---|---|---|
| 3,325,104 A | 6/1967 | Roosa |
| 6,017,300 A | 1/2000 | Herman |

(Continued)

FOREIGN PATENT DOCUMENTS

| | | |
|---|---|---|
| CN | 102821888 A | 12/2012 |
| CN | 103587083 A | 2/2014 |

(Continued)

OTHER PUBLICATIONS

Indian Office Action for Indian Application No. 202217039338, dated Nov. 30, 2022, with English translation.

(Continued)

*Primary Examiner* — Ekandra S. Miller-Cruz
(74) *Attorney, Agent, or Firm* — Birch, Stewart, Kolasch & Birch, LLP

(57) ABSTRACT

A centrifugal separator is configured to separate liquid and solid particles from a flow of gas generated by a machine. The centrifugal separator includes a centrifugal rotor, a hydraulic drive arrangement configured to rotate the centrifugal rotor, a hydraulic connection for connecting the hydraulic drive arrangement to a hydraulic circuit of the machine, and a connecting portion for connecting the centrifugal separator to the machine. The hydraulic connection is arranged on the connecting portion, and the connecting portion is configured to be inserted into a connecting aperture of the machine. A machine includes the centrifugal separator.

21 Claims, 5 Drawing Sheets

(51) Int. Cl.
  *B04B 9/06* (2006.01)
  *F01M 13/04* (2006.01)
(58) Field of Classification Search
  USPC .................................................. 210/512.1
  See application file for complete search history.

(56) References Cited

U.S. PATENT DOCUMENTS

| | | | |
|---|---|---|---|
| 6,925,993 | B1 | 8/2005 | Eliasson et al. |
| 8,657,908 | B2 | 2/2014 | Eliasson |
| 9,322,307 | B2 | 4/2016 | Andersson Aginger |
| 9,840,951 | B2 | 12/2017 | Andersson Aginger et al. |
| 2005/0120685 | A1 | 6/2005 | Fischer et al. |
| 2005/0198932 | A1 | 9/2005 | Franzen et al. |
| 2010/0011723 | A1 | 1/2010 | Szepessy et al. |
| 2018/0264485 | A1 | 9/2018 | Jannerstad et al. |
| 2020/0325807 | A1 | 10/2020 | Ishida |

FOREIGN PATENT DOCUMENTS

| | | |
|---|---|---|
| CN | 103889583 A | 6/2014 |
| DE | 10 2004 048 539 A1 | 4/2006 |
| DE | 10 2010 015 838 A1 | 10/2011 |
| DE | 10 2015 221 194 A1 | 5/2017 |
| DE | 20 2017 107 733 U1 | 3/2019 |
| EP | 0 995 496 A2 | 4/2000 |
| EP | 1 510 665 A2 | 3/2005 |
| EP | 3 112 032 A1 | 1/2017 |
| EP | 3 470 637 A1 | 4/2019 |
| FR | 2 933 626 B1 | 1/2011 |
| GB | 698206 | 10/1953 |
| JP | 47-11706 B | 4/1972 |
| JP | 2000-93842 A | 4/2000 |
| JP | 2009-520154 A | 5/2009 |
| JP | 2018-3704 A | 1/2018 |
| JP | 2018-76831 A | 5/2018 |
| KR | 10-2018-0063309 A | 6/2018 |
| WO | WO 2007/073320 A1 | 6/2007 |
| WO | WO 2011/126436 A1 | 10/2011 |
| WO | WO 2013/060678 A1 | 5/2013 |
| WO | WO2015/128825 A1 | 9/2015 |
| WO | WO 2017/175324 A1 | 10/2017 |
| WO | WO 2018/234234 A1 | 12/2018 |

OTHER PUBLICATIONS

English translation of Japanese Office Action for Japanese Application No. 2022-535647, dated May 29, 2023.
English translation of Chinese Office Action and Search Report for Chinese Application No. 202080086855.7 dated Feb. 15, 2023.
International Search Report, issued in PCT/EP2020/084517, dated Mar. 17, 2021.
Written Opinion of the International Searching Authority, issued in PCT/EP2020/084517, dated Mar. 17, 2021.

CENTRIFUGAL SEPARATOR AND MACHINE COMPRISING A CENTRIFUGAL SEPARATOR

TECHNICAL FIELD

The present disclosure relates to a centrifugal separator configured to separate liquid and solid particles from a flow of gas generated by a machine. The present disclosure further relates to a machine comprising a centrifugal separator.

BACKGROUND

A mixture of fluids having different densities may be separated from one another through use of a centrifugal separator. A centrifugal separator comprises a rotor unit rotating at high rotational speeds to generate centrifugal forces separating the fluids having different densities. The rotor unit typically comprises a disc stack of frustoconical separation discs arranged adjacent to each other with narrow separation spaces between adjacent discs.

Centrifugal separators are used for various purposes. One specific use of a centrifugal separator is to separate a liquid phase from crankcase gases of an internal combustion engine. Crankcase gases of an internal combustion engine derive from gas leaking past piston rings from combustion chambers of the internal combustion engine to the crankcase of the engine. This continuous leaking of gas into the crankcase can lead to an undesirable increase of pressure within the crankcase and, as a consequence, to a need to vent gas from the casing. Crankcase gases typically carries a quantity of engine oil, as droplets or a fine mist, as well as other liquid hydrocarbons, soot, and other solid combustion residues. These substances may be environmentally harmful substances. Therefore, for certain types of combustion engines, legislation requires crankcase gases to be disposed of in an environmentally friendly manner.

In some internal combustion engines, the crankcase gases are led to an inlet of the combustion engine. In this way, the crankcase gases will not directly be vented out to the surrounding air. However, functionality of the internal combustion engine may be adversely affected by the presence of oil in the inlet air, particularly for engines comprising turbocharging system where the efficiency of a compressor of the turbocharging system can be adversely affected. Therefore, it is an advantage if the crankcase gas is cleaned to remove oil carried by the gas prior to the gas being introduced into the inlet system. This cleaning process may be undertaken by a centrifugal separator, which is mounted on or adjacent the crankcase and which directs cleaned gas to the inlet system and directs separated oil back to the crankcase. An example of such a separator is disclosed e.g. in the document U.S. Pat. No. 8,657,908.

The rotor of a centrifugal separator can for example be driven by a hydraulic drive arrangement. Some hydraulic drive arrangements utilize impact force, e.g. where a liquid jet strikes a turbine wheel to create the rotational force. Moreover, other drive arrangements are also possible, such as a reaction drive where a liquid jet is discharged from a rotor in a tangential direction, at a position offset from the rotational axis of the rotor, thereby providing the rotational force of the rotor. An example of such a drive arrangement can be found in the document US 2005/0198932 A1.

The hydraulic drive arrangement can utilize engine oil of an internal combustion engine to rotate the rotor unit. One problem associated with this type of centrifugal separator is the connection of the centrifugal separator to the internal combustion engine, commonly to the engine block of the engine. Most often, a flange of a turbine housing of the centrifugal separator is connected to a flange interface of the internal combustion engine. The flange interface of the internal combustion engine, e.g. in the engine block, may comprise a drive oil aperture feeding oil to the hydraulic drive arrangement via an aperture arranged on the flange of the turbine housing. Combustion engines comes in a variety of sizes and designs and usually, one type of turbine housing needs to be developed per type of internal combustion engine. The design is usually complicated, and tooling and production costs are relatively high. The flange interface on the combustion engine is also relatively complicated with high tolerances for flatness and positioning of the drive oil aperture.

In general, on today's market, it is an advantage if products, such as centrifugal separators and associated components, have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a centrifugal separator configured to separate liquid and solid particles from a flow of gas generated by a machine. The centrifugal separator comprises a centrifugal rotor, a hydraulic drive arrangement configured to rotate the centrifugal rotor, a hydraulic connection for connecting the hydraulic drive arrangement to a hydraulic circuit of the machine, and a connecting portion for connecting the centrifugal separator to the machine. The hydraulic connection is arranged on the connecting portion and the connecting portion is configured to be inserted into a connecting aperture of the machine.

Since the hydraulic connection is arranged on the connecting portion and the connecting portion is configured to be inserted into a connecting aperture of the machine, for instance into an engine block of an internal combustion engine, a centrifugal separator is provided circumventing the need for a costly and complex turbine housing and a costly and complex flange interface on the machine.

Instead, the connecting portion of the centrifugal separator can be manufactured using relatively simple and low cost methods and tools. Likewise, the connecting aperture of the machine can be manufactured using relatively simple and low cost methods and tools.

In addition, the need for developing several types of turbine housings for different types of machines is circumvented. Moreover, a centrifugal separator is provided having conditions for being mounted to a machine in a simple and reliable manner.

Accordingly, a centrifugal separator is provided having conditions and characteristics suitable for being manufactured and assembled in a cost-efficient manner. Furthermore, the centrifugal separator provides conditions for lowering design and manufacturing costs of connection interfaces of machines.

Accordingly, a centrifugal separator is provided overcoming, or at least alleviating, at least some of the above-mentioned problems and drawbacks. As a result, the above-mentioned object is achieved.

Optionally, the connecting portion of the centrifugal separator is substantially cylindrical, substantially conical, or a combination thereof, i.e. comprising both a cylindrical and a conical portion. Thereby, a centrifugal separator is provided having conditions for being mounted to a machine in an even simpler and more reliable manner. In addition, the connecting portion of the centrifugal separator has conditions for being manufactured using relatively simple and low cost methods and tools. Likewise, the connecting aperture of the machine can be manufactured using relatively simple and low cost methods and tools.

Optionally, the connecting portion of the centrifugal separator comprises a groove, and wherein the hydraulic connection is arranged in the groove. Thereby, a fluid connection between the hydraulic connection and the hydraulic circuit of the machine can be obtained in a simpler and more reliable manner. In addition, lower tolerances for the positioning of the hydraulic connection can be used, and lower tolerances can be used for an aperture of hydraulic circuit of the machine, thus potentially reducing manufacturing and assembling costs of the centrifugal separator and of the connecting aperture of the machine.

Optionally, the groove extends along more than 50% of the circumference of the connecting portion, or preferably along the entire circumference of the connecting portion. Thereby, a fluid connection between the hydraulic connection and the hydraulic circuit of the machine can be obtained in a simpler and more reliable manner. In addition, lower tolerances for the positioning of the hydraulic connection can be used, and lower tolerances can be used for an aperture of hydraulic circuit of the machine, thus potentially reducing manufacturing and assembling costs of the centrifugal separator and of the connecting aperture of the machine.

Optionally, the connecting portion comprises at least one sealing on each side of the groove. Thereby, leakage of hydraulic fluid is avoided in a simple and reliable manner. In addition, lower tolerances can be used for the surfaces of the connecting portion and surfaces of the connecting aperture of the machine, thus potentially reducing manufacturing and assembling costs of the centrifugal separator and of the connecting aperture of the machine.

Optionally, a centre axis of the connecting portion is substantially parallel to a rotation axis of the centrifugal rotor. Thereby, a compact centrifugal separator can be provided having conditions and characteristics suitable for being manufactured and assembled in a cost-efficient manner.

Optionally, a centre axis of the connecting portion is substantially coaxial with a rotation axis of the centrifugal rotor. Thereby, a compact centrifugal separator is provided having conditions and characteristics suitable for being manufactured and assembled in a cost-efficient manner.

Optionally, the hydraulic drive arrangement comprises a turbine connected to the centrifugal rotor and a first nozzle configured to eject a liquid onto the turbine. Thereby, a simple, reliable, and efficient hydraulic drive arrangement is provided.

Optionally, the hydraulic drive arrangement comprises at least a second nozzle configured to eject a liquid onto the turbine. Thereby, a further reliable hydraulic drive arrangement is provided. This because the hydraulic drive arrangement comprises at least two nozzles configured to eject a liquid onto the turbine. Thereby, the hydraulic drive arrangement can continue to function even in case of a malfunction a nozzle.

Optionally, the centrifugal separator is configured to be connected to the machine such that a rotation axis of the centrifugal rotor is substantially parallel to a horizontal plane when the machine is oriented in an upright use position. Thereby, less space is required for the centrifugal separator in a vertical direction of the machine, and more freedom is provided in the positioning of the centrifugal separator onto the machine. In this context, "substantially horizontal" includes a rotational axis at a small angle to the horizontal plane, such as an angle of less than 20 degrees to the horizontal plane. Preferably, the angle between the rotational axis and the horizontal plane is less than 10 degrees.

Optionally, the centrifugal separator comprises a return conduit configured to return liquid and solid particles separated by the centrifugal rotor to the hydraulic circuit of the machine, e.g. to an engine oil sump of an internal combustion engine, and wherein the return conduit is arranged below a rotation axis of the centrifugal rotor when the centrifugal separator is oriented in an intended use position. Thereby, liquid and solid particles separated by the centrifugal rotor can be returned to the hydraulic circuit of the machine in a simple, reliable and efficient manner.

Optionally, the return conduit is arranged below an outer periphery of the centrifugal rotor when the centrifugal separator is oriented in the intended use position. Thereby, liquid and solid particles separated by the centrifugal rotor can be returned to the hydraulic circuit of the machine in a simple, reliable and efficient manner.

Optionally, the return conduit is formed as a slot. Thereby, interference between internal gas flow and separated liquid and solid particles can be avoided.

Optionally, the centrifugal separator comprises a separator housing, and wherein the return conduit is arranged in the separator housing. Thereby, a compact centrifugal separator can be provided having conditions and characteristics suitable for being manufactured and assembled in a cost-efficient manner.

Optionally, the return conduit comprises a one-way valve. Thereby, a flow of gas, or other substances, is avoided from the machine to the centrifugal separator via the return conduit.

Optionally, the centrifugal rotor comprises a stack of frustoconical separation discs configured to separate liquid and solid particles from the flow of gas generated by the machine during rotation of the centrifugal rotor. Thereby, an efficient and reliable centrifugal separator is provided.

Optionally, the machine is an internal combustion engine, and wherein the centrifugal separator is configured to separate liquid and solid particles from a flow of crankcase gases generated by the internal combustion engine. Thereby, a centrifugal separator is provided circumventing the need for a costly and complex flange interface on the internal combustion engine. Moreover, the connecting aperture of the internal combustion engine can be manufactured using relatively simple and low cost methods and tools.

In addition, the need for developing several types of turbine housings for different types of internal combustion engines is circumvented. Furthermore, the centrifugal separator provides conditions for lowering design and manufacturing costs of connection interfaces of internal combustion engines.

According to a second aspect of the invention, the object is achieved by a machine configured to generate a flow of gas. The machine comprises a connecting aperture, a hydraulic circuit connected to the connecting aperture, and a centrifugal separator configured to separate liquid and solid particles from the flow of gas generated by the machine. The centrifugal separator comprises a connecting portion inserted into the connecting aperture, a centrifugal rotor, a hydraulic drive arrangement configured to rotate the centrifugal rotor, and a hydraulic connection arranged on the connecting portion. The hydraulic connection connects the hydraulic drive arrangement to the hydraulic circuit of the machine.

Since the hydraulic connection is arranged on the connecting portion and the connecting portion inserted into the connecting aperture of the machine, a machine is provided circumventing the need for a costly and complex turbine housing of the centrifugal separator and a costly and complex flange interface on the machine.

Instead, the connecting portion of the centrifugal separator can be manufactured using relatively simple and low cost methods and tools. Likewise, the connecting aperture of the machine can be manufactured using relatively simple and low cost methods and tools.

In addition, the need for developing several types of turbine housings for different types of machines is circumvented. Moreover, a machine is provided in which the centrifugal separator can be mounted to the machine in a simple and reliable manner.

Accordingly, a machine is provided having conditions and characteristics suitable for being manufactured and assembled in a cost-efficient manner.

Accordingly, a machine is provided overcoming, or at least alleviating, at least some of the above-mentioned problems and drawbacks. As a result, the above-mentioned object is achieved.

Optionally, the connecting aperture of the machine and the connecting portion of the centrifugal separator together form a connection interface, wherein the connection interface comprises a groove, and wherein the hydraulic connection is fluidly connected to the groove. Thereby, a fluid connection between the hydraulic connection and the hydraulic circuit of the machine can be obtained in a simpler and more reliable manner. In addition, lower tolerances for the positioning of the hydraulic connection can be used, and lower tolerances can be used for an aperture of hydraulic circuit of the machine, thus potentially reducing manufacturing and assembling costs of the centrifugal separator and of the connecting aperture of the machine. The groove of the connection interface may be arranged in the connecting portion of the centrifugal separator, or in the connecting aperture of the machine.

Optionally, the connection interface comprises at least one sealing on each side of the groove. Thereby, leakage of hydraulic fluid is avoided in a simple and reliable manner. In addition, lower tolerances can be used for the surfaces of the connecting portion and surfaces of the connecting aperture of the machine, thus potentially reducing manufacturing and assembling costs of the centrifugal separator and of the connecting aperture of the machine. The sealings of the connection interface may be arranged in the connecting portion of the centrifugal separator, or in the connecting aperture of the machine.

Optionally, the machine is an internal combustion engine, and wherein the centrifugal separator is configured to separate liquid and solid particles from a flow of crankcase gases generated by the internal combustion engine. Thereby, an internal combustion engine is provided circumventing the need for a costly and complex turbine housing of the centrifugal separator and a costly and complex flange interface on the machine. Moreover, an internal combustion engine is provided in which the centrifugal separator can be mounted to the internal combustion engine in a simple and reliable manner. Moreover, the connecting aperture of the internal combustion engine can be manufactured using relatively simple and low cost methods and tools.

Accordingly, an internal combustion engine is provided having conditions and characteristics suitable for being manufactured and assembled in a cost-efficient manner.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
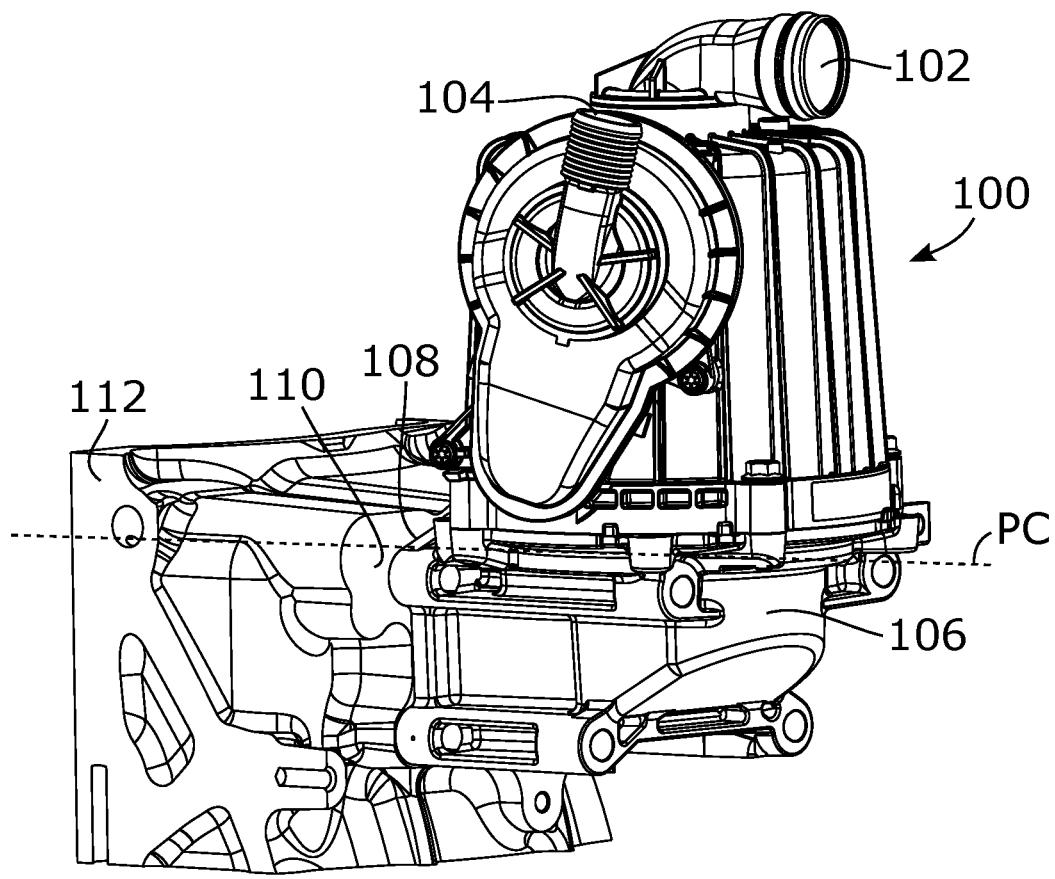
FIG. 1 illustrates an example of a prior art centrifugal separator mounted to an internal combustion engine.

FIG. 1 illustrates an example of a prior art centrifugal separator 100 mounted to an internal combustion engine 112. The centrifugal separator 100 comprises a gas inlet 102, a gas outlet 104, a separator housing 105 and a turbine housing 106. The turbine housing 106 comprises a flange 108. The flange 108 of the turbine housing 106 is mounted to a flange interface 110 of the internal combustion engine 112. The centrifugal separator 100 is configured to separate liquid and solid particles from a flow of crankcase gases generated by the internal combustion engine 112 using a centrifugal rotor arranged in the separator housing 106. The centrifugal rotor of the centrifugal separator 100 is not illustrated in FIG. 1 for the reason of brevity and clarity. The gas inlet 102 may be connected to crankcase ventilation aperture of the internal combustion engine 112 and the gas outlet 104 may be connected to an air inlet of the internal combustion engine 112 or to the atmosphere.

Figure 2:
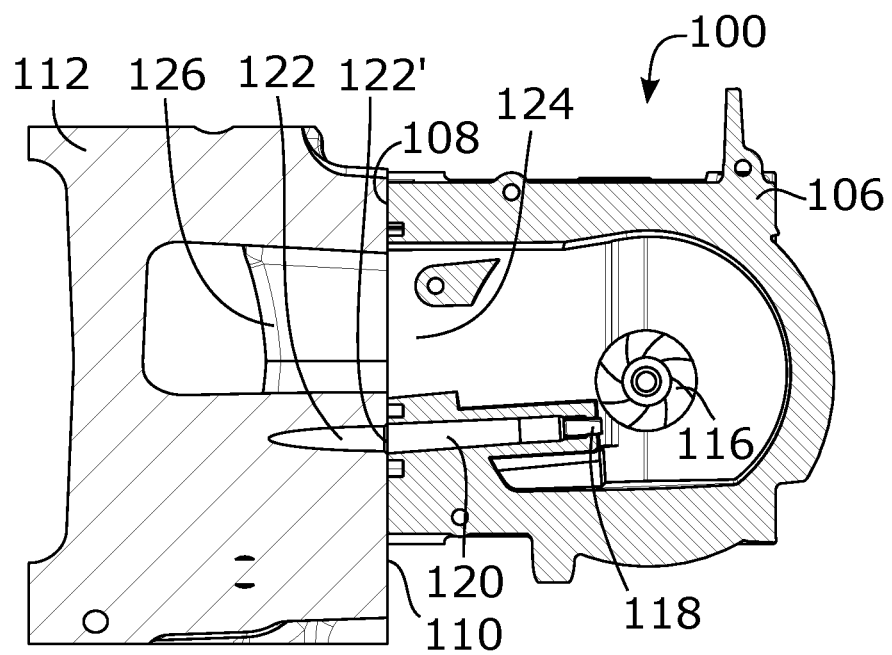
FIG. 2 illustrates a cross section of the prior art centrifugal separator and of the internal combustion engine illustrated in FIG. 1.

FIG. 2 illustrates a cross section of the prior art centrifugal separator 100 and of the internal combustion engine 112 illustrated in FIG. 1. In FIG. 2, the cross section is made in a cross section plane PC indicated in FIG. 1. The cross section plane PC extends through the turbine housing 106 and the flange 108 of the turbine housing 106. Moreover, the cross section plane PC extends through the flange interface 110 of the internal combustion engine 112.

As can be seen in FIG. 2, the turbine housing 106 comprises a hydraulic drive arrangement 116, 118. The hydraulic drive arrangement 116, 118 is configured to rotate the centrifugal rotor of the centrifugal separator 100 during operation of the centrifugal separator 100. The hydraulic drive arrangement 116, 118 comprises a turbine 116 connected to the centrifugal rotor and a nozzle 118 configured to eject oil onto the turbine 116. As seen in FIG. 2, the turbine housing 106 comprises a hydraulic connection 120 connecting the nozzle 118 of the hydraulic drive arrangement 116, 118 to an engine oil circuit 122 of the internal combustion engine 112.

Engine oil is fed to the nozzle 118 of the hydraulic drive arrangement 116, 118 via the engine oil circuit 122 and the hydraulic connection 120 during operation of the internal combustion engine 112. The engine oil is ejected from the nozzle 118 onto the turbine 116 and is returned to the internal combustion engine 112 via a return duct 124 connected to a return aperture 126 of the internal combustion engine 112. The return aperture 126 of the internal combustion engine 112 is connected to an engine oil sump of the internal combustion engine 112.

As understood from the above, the turbine housing 106 of the prior art centrifugal separator 100 has tree functions. Namely to function as a console for the centrifugal separator 100, provide an interface for drive oil, and to return drained oil and drive oil to the engine oil sump of the internal combustion engine 112. Combustion engines 112 comes in a variety of sizes and designs and usually, one type of turbine housing 106 is developed per type of internal combustion engine 112. The design is usually complicated, and tooling and production costs are relatively high. For example, the flange 108 of the turbine housing 106 and the flange interface 110 of the internal combustion engine 112 require high tolerances for flatness. Moreover, the position of the hydraulic connection 120 of the turbine housing 106 and the position of an aperture 122' of the engine oil circuit 122 of the internal combustion engine 112 require high tolerances.

In summary, partly due to the above given reasons, the turbine housing 106 of a prior art centrifugal separator 100 constitutes a great proportion of the total cost of the centrifugal separator 100. Moreover, the prior art centrifugal separator 100 requires manufacturers of internal combustion engines 112 to develop costly and complicated flange interfaces 110 for the connection of a centrifugal separator 100.

Figure 3:
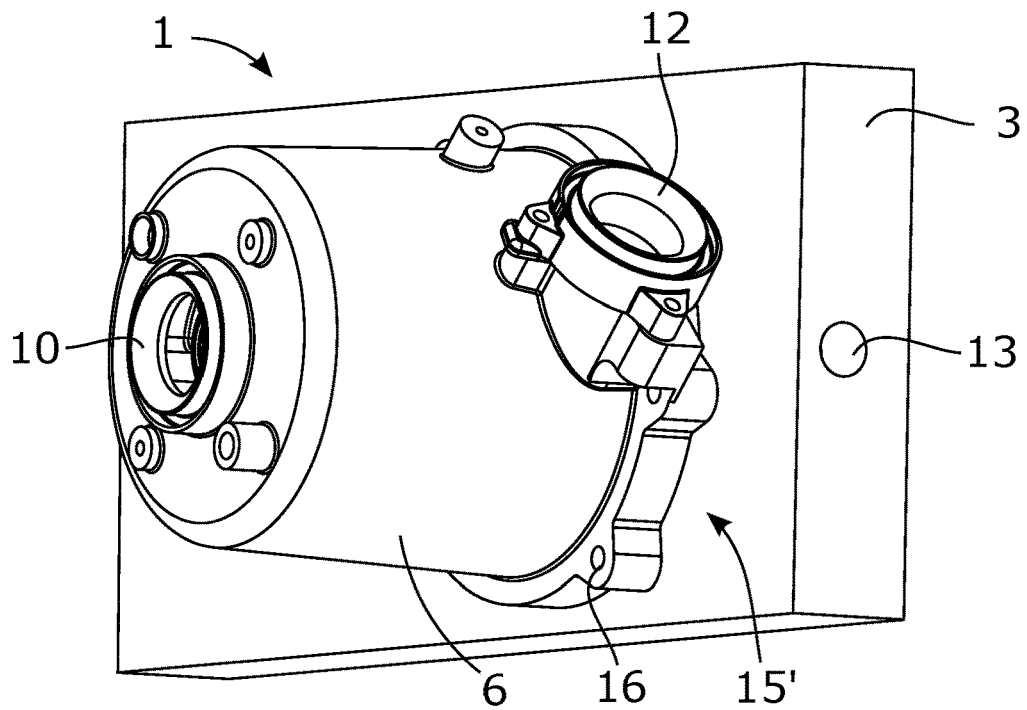
FIG. 3 illustrates a perspective view of a centrifugal separator according to some embodiments of the present disclosure mounted to a machine.

FIG. 3 illustrates a perspective view of a centrifugal separator 1 according to some embodiments of the present disclosure mounted to a machine 3. The centrifugal separator 1 is configured to separate liquid and solid particles from a flow of gas generated by the machine 3. The centrifugal separator 1 comprises a separator housing 6, a gas inlet 10 and a gas outlet 12. The centrifugal separator 1 is configured to separate liquid and solid particles from a flow of gas flowing from the gas inlet 10 to the gas outlet 12.

As is further explained herein, the machine 3 may be an internal combustion engine, wherein the centrifugal separator 1 is configured to separate liquid and solid particles from a flow of crankcase gases generated by the internal combustion engine. According to such embodiments, the gas inlet 10 of the centrifugal separator 1 may be connected to a crankcase ventilation aperture of the internal combustion engine and the gas outlet 12 may be connected to an air inlet of the internal combustion engine, or to the atmosphere, as is further explained herein.

Figure 4:
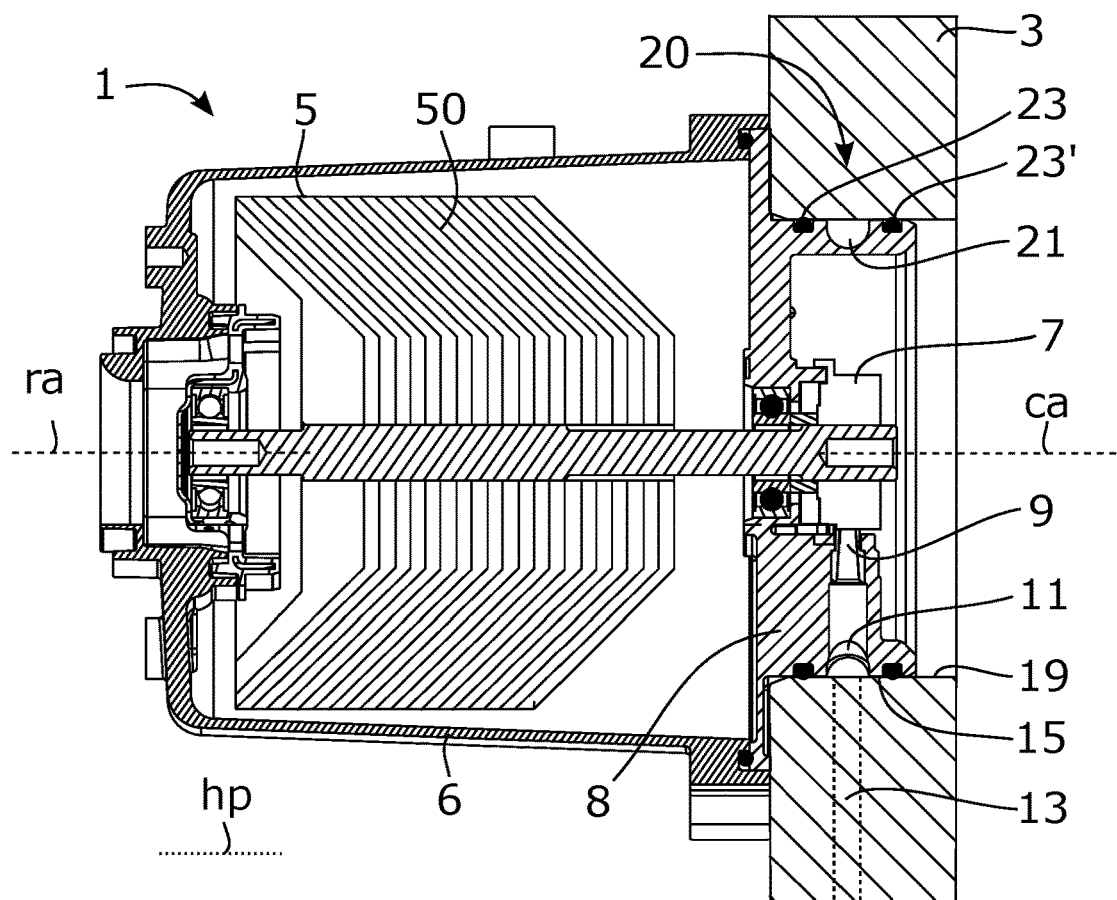
FIG. 4 illustrates a cross section of the centrifugal separator and the machine illustrated in FIG. 3.

FIG. 4 illustrates a cross section of the centrifugal separator 1 and the machine 3 illustrated in FIG. 3. As can be seen in FIG. 4, the centrifugal separator 1 comprises a centrifugal rotor 5. The centrifugal rotor 5 is configured to rotate around a rotation axis ra during operation of the centrifugal separator 1. In FIG. 4, the cross section is made in a plane comprising the rotation axis ra. The centrifugal rotor 5 comprises a stack of frustoconical separation discs 50 configured to separate liquid and solid particles from the flow of gas generated by the machine 3 during rotation of the centrifugal rotor 5. According to other embodiments, the centrifugal rotor 5 may, instead of comprising a stack of conical discs, comprise axial plates, a rotating filter, or a rotating coalescer. In yet another embodiment, the centrifugal rotor may comprise a rotating stack of centrifugal discs in combination with a rotating filter or a rotating coalesce.

The centrifugal separator 1 comprises a hydraulic drive arrangement 7, 9. The hydraulic drive arrangement 7, 9 is configured to rotate the centrifugal rotor 5. According to the illustrated embodiments, the hydraulic drive arrangement 7, 9 comprises a turbine 7 connected to the centrifugal rotor 5 and a first nozzle 9 configured to eject a liquid onto the turbine 7. According to further embodiments, the centrifugal separator 1 may comprise another type of hydraulic drive arrangement for rotating the centrifugal rotor 5, such as a reaction drive arrangement where a liquid jet is discharged from a rotor in a tangential direction, at a position offset from the rotational axis of the rotor, thereby providing the rotational force of the rotor. Moreover, the centrifugal rotor 5 of the centrifugal separator 1 may be provided with a central inlet for pressurised liquid, and at least one liquid outlet radially spaced from the rotational axis of the centrifugal rotor 5, said outlet(s) being directed in an at least partly tangential direction to accomplish a reaction drive of the centrifugal rotor 5. One example of such a reaction drive arrangement is disclosed in U.S. Patent Application No. 2005/0198932.

According to the illustrated embodiments, the centrifugal separator 1 comprises a turbine housing 8 connected to the separator housing 6, wherein the hydraulic drive arrangement 7, 9 is arranged in the turbine housing 8. The centrifugal separator 1 comprises a hydraulic connection 11 for connecting the hydraulic drive arrangement 7, 9 to a hydraulic circuit 13 of the machine 3. A portion of the hydraulic circuit 13 of the machine 3 is also indicated in FIG. 3. In embodiments where the machine 3 is an internal combustion engine, the hydraulic circuit 13 may be an engine oil circuit of the internal combustion engine. The centrifugal separator 1 comprises a connecting portion 15 for connecting the centrifugal separator 1 to the machine 3. According to the illustrated embodiments, the connecting portion 15 is arranged on the turbine housing 8. Moreover, according to the illustrated embodiments, the connecting portion 15 form part of a mounting section 15' of the centrifugal separator 1. The mounting section 15' of the centrifugal separator 1 is also indicated in FIG. 3. As indicated in FIG. 3, the mounting section 15' comprises a number of through holes 16. The through holes 16 are configured to receive a fastening element, such as a screw or bolt, to fasten the centrifugal separator 1 to the machine 3.

As seen in FIG. 4, the hydraulic connection 11 is arranged on the connecting portion 15. Moreover, as seen in FIG. 4, the connecting portion 15 is configured to be inserted into a connecting aperture 19 of the machine 3. As indicated in FIG. 4, the hydraulic circuit 13 of the machine 3 is connected to the connecting aperture 19 and the hydraulic connection 11 connects the hydraulic drive arrangement 7, 9 to the hydraulic circuit 13 of the machine 3. Since the hydraulic connection 11 is arranged on the connecting portion 15 and the connecting portion 15 is configured to be inserted into a connecting aperture 19 of the machine 3, a centrifugal separator is provided circumventing the need for a costly and complex turbine housing 8 and a costly and complex flange interface on the machine 3, as is further explained herein.

According to the illustrated embodiments, a centre axis ca of the connecting portion 15 is substantially parallel to the rotation axis ra of the centrifugal rotor 5. Moreover, according to the illustrated embodiments, the centre axis ca of the connecting portion 15 is substantially coaxial with the rotation axis ra of the centrifugal rotor 5. Due to these features, a compact centrifugal separator 1 is provided having conditions and characteristics suitable for being manufactured and assembled in a cost-efficient manner. According to the illustrated embodiments, the centrifugal separator 1 is configured to be connected to the machine 3 such that a rotation axis ra of the centrifugal rotor 5 is substantially parallel to a horizontal plane hp when the machine 3 is oriented in an upright use position. According to further embodiments, the centrifugal separator 1 is configured to be connected to the machine 3 such that a rotation axis ra of the centrifugal rotor 5 is transversal to a horizontal plane hp, such as for example substantially perpendicular to the horizontal plane hp, when the machine 3 is oriented in an upright use position.

The connecting aperture 19 of the machine 3 and the connecting portion 15 of the centrifugal separator 1 together form a connection interface 20. The connection interface 20 comprises a groove 21, wherein the hydraulic connection 11 is fluidly connected to the groove 21. In this manner, hydraulic fluid from the hydraulic circuit 13 of the machine 3 can flow into the hydraulic connection 11 via the groove 21 during operation of the machine 3. According to the illustrated embodiments, the connection interface 20 comprises at least one sealing 23, 23' on each side of the groove 21. In this manner, leakage of hydraulic fluid is avoided.

As seen in FIG. 4, according to the illustrated embodiments, the connecting portion 15 of the centrifugal separator 1 comprises the groove 21, wherein the hydraulic connection 11 is arranged in the groove 21. Moreover, the hydraulic circuit 13 of the machine 3 is configured to superimpose the groove 21 when the connecting portion 15 of the centrifugal separator 1 is inserted into the connecting aperture 19 of the machine 3. Furthermore, as is indicated in FIG. 4, the connecting portion 15 comprises the least one sealing 23, 23' on each side of the groove 21.

According to further embodiments of the present disclosure, the connecting aperture 19 of the machine 3 may comprise a groove, wherein the hydraulic connection 11 of the centrifugal separator 1 is configured to superimpose the groove when the connecting portion 15 of the centrifugal separator 1 is inserted into the connecting aperture 19 of the machine 3. Moreover, according to some embodiments of the present disclosure, the connecting aperture 19 of the machine 3 may comprise one or more sealings configured to seal the connection interface 20.

Figure 5:
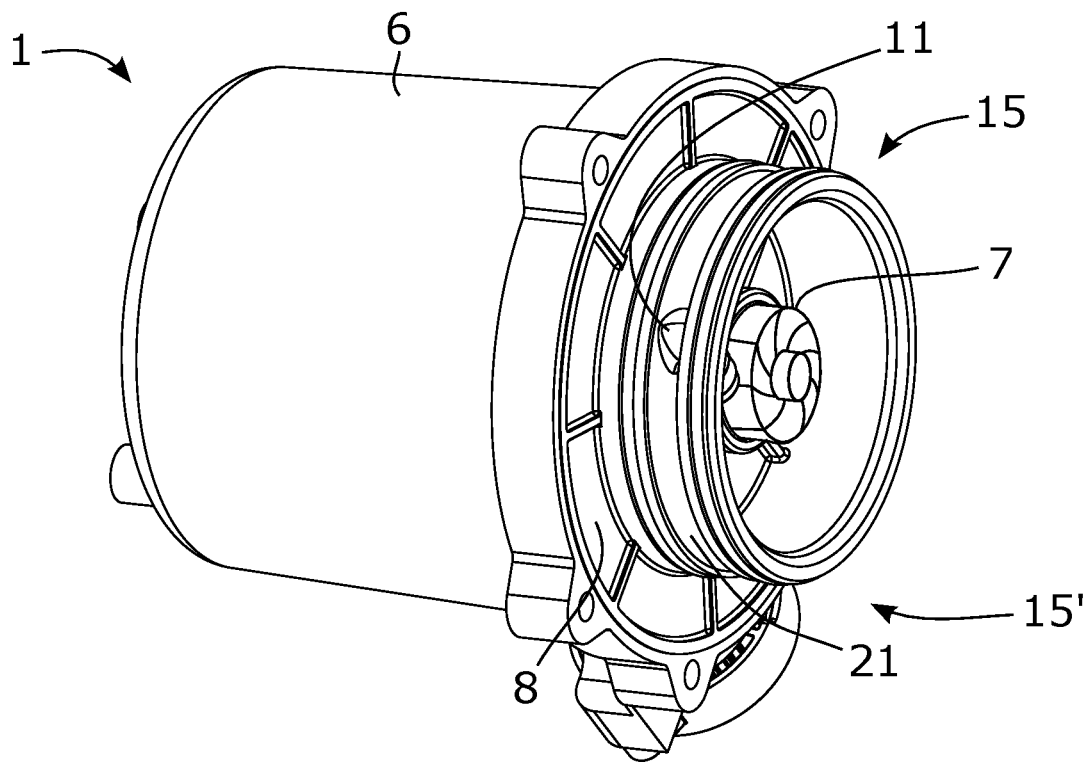
FIG. 5 illustrates a perspective view of the centrifugal separator illustrated in FIG. 3 and FIG. 4.

FIG. 5 illustrates a perspective view of the centrifugal separator 1 illustrated in FIG. 3 and FIG. 4. As best seen in FIG. 5, according to the embodiments illustrated in FIG. 3-FIG. 5, the connecting portion 15 of the centrifugal separator 1 is cylindrical. According to further embodiments, the connecting portion 15 of the centrifugal separator 1 may be substantially cylindrical. The connecting aperture 19 of the machine 3 may also be cylindrical or substantially cylindrical. The wording "substantially cylindrical", as used herein, may encompass that the object referred to deviates less than 5% geometrically from the shape of a cylinder.

According to the illustrated embodiments, the groove 21 extends along the entire circumference of the connecting portion 15. According to further embodiments, the groove 21 may extend along more than 50% of the circumference of the connecting portion 15. In this manner, a fluid connection between the hydraulic connection 11 and the hydraulic circuit of the machine can be obtained in a simpler and more reliable manner. That is, due to these features, a greater freedom is provided in the rotational position of the centrifugal separator 1 relative to the machine. Moreover, a greater freedom is provided in the positioning of the hydraulic circuit of the machine, which potentially reduces manufacturing and assembling costs of the centrifugal separator 1 and of the machine.

Figure 6:
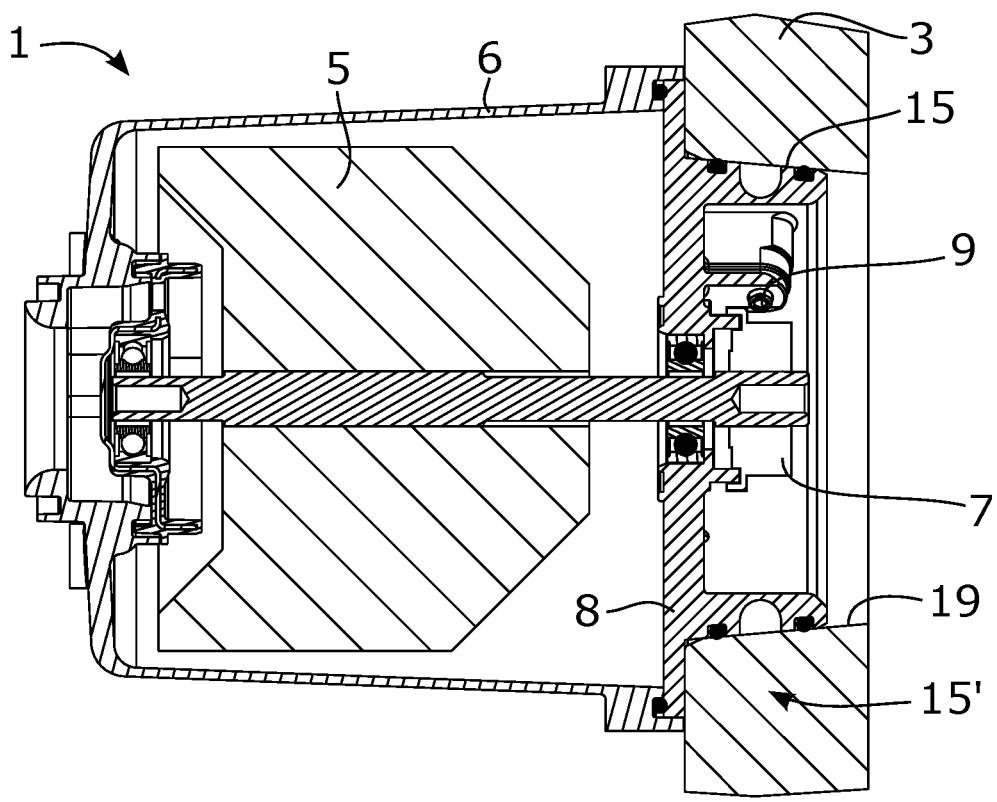
FIG. 6 illustrates a cross section of a centrifugal separator according to some further embodiments of the present disclosure mounted to a machine.

FIG. 6 illustrates a cross section of a centrifugal separator 1 according to some further embodiments of the present disclosure mounted to a machine 3. The centrifugal separator 1 according to the embodiments illustrated in FIG. 6 may comprise the same features, functions, and advantages, as the centrifugal separator 1 explained with reference to FIG. 3-FIG. 5, with some differences explained below. According to the embodiments illustrated in FIG. 6, the connecting portion 15 of the centrifugal separator 1 is conical with the narrow portion facing the machine 3. According to further embodiments, the connecting portion 15 of the centrifugal separator 1 may be substantially conical.

As can be seen in FIG. 6, according to these embodiments, the connecting aperture 19 of the machine 3 may also be conical, or substantially conical, with the wider portion facing the centrifugal separator 1. Due to these features, the connecting portion 15 of the centrifugal separator 1 may be inserted into the connecting aperture 19 of the machine 3 in a simpler manner. The wording "substantially conical", as used herein, may encompass that the object referred to deviates less than 5% geometrically from the shape of a cone.

Figure 7:
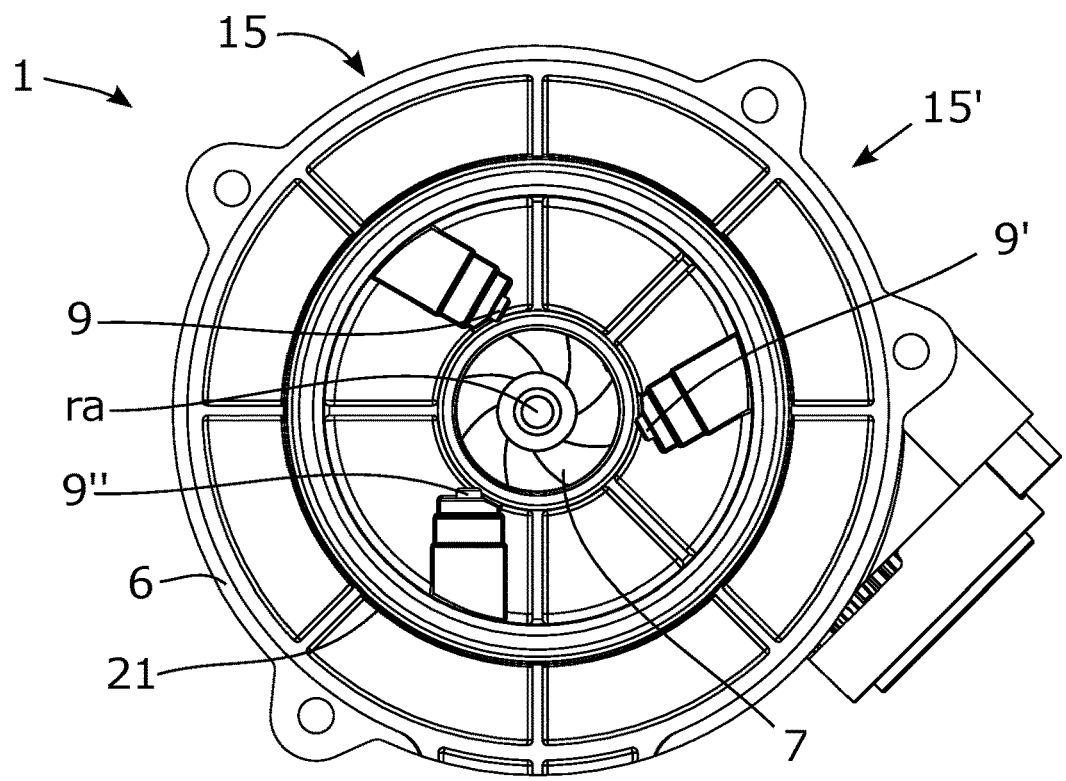
FIG. 7 illustrates a centrifugal separator according to some further embodiments of the present disclosure.

FIG. 7 illustrates a centrifugal separator 1 according to some further embodiments of the present disclosure. The centrifugal separator 1 according to the embodiments illustrated in FIG. 7 may comprise the same features, functions, and advantages, as the centrifugal separator 1 explained with reference to FIG. 3-FIG. 6, with some differences explained below. According to the embodiments illustrated in FIG. 7, the hydraulic drive arrangement 7, 9 comprises three nozzles 9, 9', 9", namely a first, a second, and a third nozzle 9, 9', 9" each configured to eject a liquid onto the turbine 7. According to further embodiments, the hydraulic drive arrangement 7, 9 may comprise two or more nozzles 9, 9', 9". Thereby, a more reliable hydraulic drive arrangement 7, 9 is provided because the hydraulic drive arrangement 7, 9 can continue to function even in case of a malfunction of one or more of the nozzles 9, 9', 9". A malfunction of a nozzle 9, 9', 9"may for example occur if a nozzle 9, 9', 9" becomes clogged.

According to the illustrated embodiments, the connecting portion 15 of the centrifugal separator 1 comprises a groove 21 extending along the entire circumference of the connecting portion 15. Each nozzle 9, 9', 9" is fluidly connected to the groove 21 which allows for a simple and efficient design in which the nozzles 9, 9', 9" are fed with a liquid from a hydraulic circuit of a machine.

Figure 8:
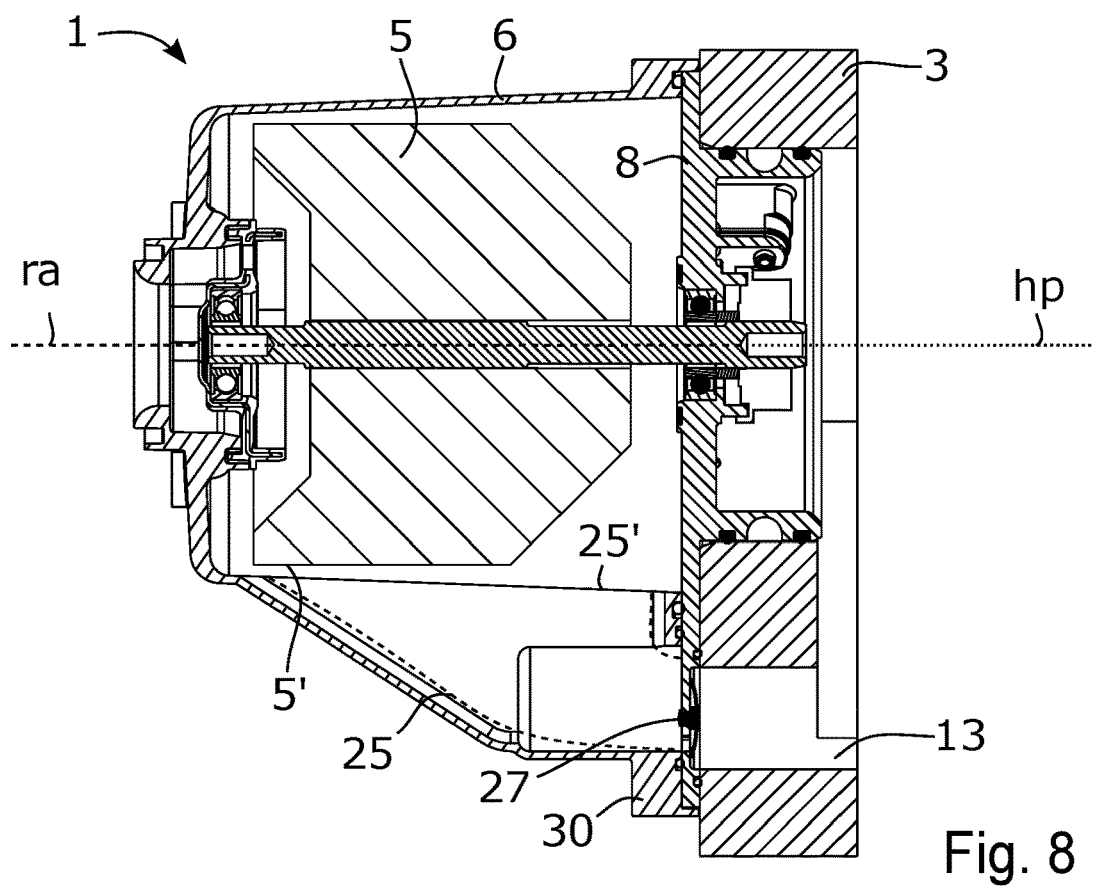
FIG. 8 illustrates a cross section of a centrifugal separator according to some further embodiments of the present disclosure mounted to a machine.

FIG. 8 illustrates a cross section of a centrifugal separator 1 according to some further embodiments of the present disclosure mounted to a machine 3. The centrifugal separator 1 according to the embodiments illustrated in FIG. 8 may comprise the same features, functions, and advantages, as the centrifugal separator 1 explained with reference to FIG. 3-FIG. 7, with some differences explained below. According to the embodiments illustrated in FIG. 8, the centrifugal separator 1 comprises a return conduit 25. The return conduit 25 is configured to return liquid and solid particles separated by the centrifugal rotor 5 of the centrifugal separator 1 to the hydraulic circuit 13 of the machine 3. According to the illustrated embodiments, the centrifugal separator 1 is configured to be connected to the machine 3 such that a rotation axis ra of the centrifugal rotor 5 is substantially parallel to a horizontal plane hp when the machine 3 is oriented in an upright use position. As can be seen in FIG. 8, the return conduit 25 is arranged below the rotation axis ra of the centrifugal rotor 5 when the centrifugal separator 1 is oriented in an intended use position. In FIG. 8, the centrifugal separator 1 is oriented in the intended use position. Moreover, the return conduit 25 is arranged below an outer periphery 5' of the centrifugal rotor 5 when the centrifugal separator 1 is oriented in the intended use position. In this manner, liquid and solid particles separated by the centrifugal rotor 5 can be returned to the hydraulic circuit 13 of the machine 3 in an efficient manner by gravity.

Moreover, according to the illustrated embodiments, the return conduit 25 comprises a one-way valve 27 configured to allow flow of fluid from the return conduit 25 to the hydraulic circuit 13 of the machine 3 and is configured to hinder flow of fluid from the hydraulic circuit 13 of the machine 3 to the return conduit 25 of the centrifugal separator 1. According to the illustrated embodiments, the return conduit 25 is formed in the separator housing 6 of the centrifugal separator 1.

Figure 9:
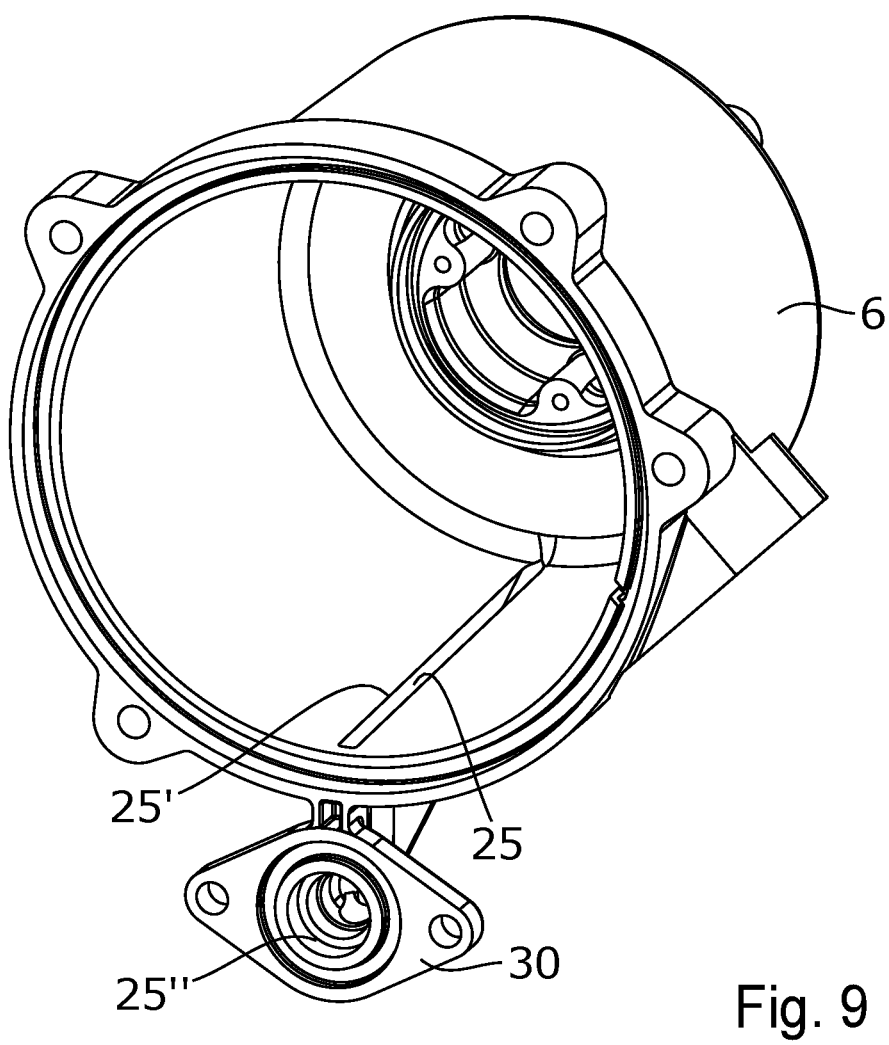
FIG. 9 illustrates a perspective view of a separator housing of the centrifugal separator illustrated in FIG. 8, and FIG. 10 schematically illustrates a machine according to some embodiments of the present disclosure.

FIG. 9 illustrates a perspective view of the separator housing 6 of the centrifugal separator 1 illustrated in FIG. 8. As best seen in FIG. 9, the return conduit 25 is formed as a narrow slot. In this manner, interference between internal gas flow and separated liquid and solid particles can be avoided. Moreover, as can be seen in FIG. 9, as well as in FIG. 8, an opening 25' of the return conduit 25 in the separator housing 6 is provided with a considerable length measured in a direction of the rotation axis ra of the centrifugal rotor 5. In this manner, a flow of separated liquid and solid particles can be ensured from the separator housing 6 even when the centrifugal separator 1 is inclined relative to the horizontal plane hp.

The following is explained with reference to FIG. 8. According to the illustrated embodiments, the length of the opening 25' of the return conduit 25 is approximately 100% of the length of the centrifugal rotor 5 measured in the direction of the rotation axis ra of the centrifugal rotor 5. According to further embodiments, the length of the opening 25' of the return conduit 25 may be within the range of 30%-150%, or 50%-135% of the length of the centrifugal rotor 5 measured in the direction of the rotation axis ra of the centrifugal rotor 5.

As indicated in FIG. 8 and FIG. 9, the separator housing 6 of the centrifugal separator 1 comprises a flange 30 for connecting an outlet portion 25" of the return conduit to the hydraulic circuit 13 of the machine 3.

Figure 10:
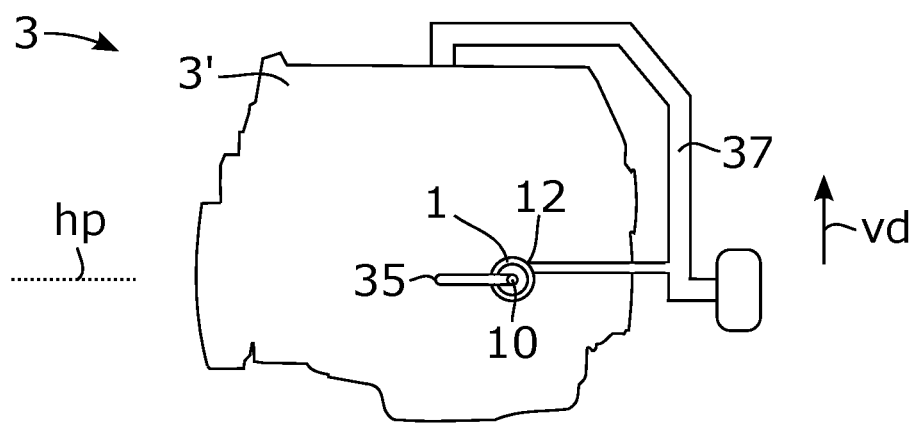

FIG. 10 schematically illustrates a machine 3 according to some embodiments of the present disclosure. According to the illustrated embodiments, the machine 3 is an internal combustion engine 3'. The internal combustion engine 3' may for example be a compression ignition engine, such as a diesel engine, or an Otto engine with a spark-ignition device, wherein the Otto engine may be configured to run on gas, petrol, alcohol, similar volatile fuels, or combinations thereof. The internal combustion engine 3' may be configured to provide motive power to a vehicle comprising the internal combustion engine 3'. The vehicle may be a truck or another type of manned or unmanned vehicle for land or water based propulsion such as a lorry, a bus, a construction vehicle, a tractor, a car, a ship, a boat, or the like.

The internal combustion engine 3' comprises a centrifugal separator 1. The centrifugal separator 1 may be a centrifugal separator 1 according to any one of the embodiments explained with reference to FIG. 3-FIG. 9. The centrifugal separator 1 is configured to separate liquid and solid particles from a flow of crankcase gases generated by the internal combustion engine 3'. As can be seen in FIG. 10, the gas inlet 10 of the centrifugal separator 1 is connected to a crankcase venting aperture 35 of the internal combustion engine 3'. The gas outlet 12 of the internal combustion engine 3' is connected to an air inlet system 37 of the internal combustion engine 3'. In this manner, the centrifugal separator 1 can separate liquid and solid particles from a flow of crankcase gases generated by the internal combustion engine 3' and cleaned air can be returned to the air inlet system 37. Thereby, the emission of liquid and solid particles from the crankcase is avoided. According to further embodiments, the gas outlet 12 of the internal combustion engine 3' may be connected to the atmosphere.

According to the embodiments illustrated in FIG. 10, the centrifugal separator 1 is connected to the machine 3 such that a rotation axis ra of the centrifugal rotor of the centrifugal separator 1 is substantially parallel to a horizontal plane hp when the machine 3 is oriented in an upright use position. In FIG. 10, the machine 3 is oriented in the upright use position. In this manner, less space is required for the centrifugal separator 1 in the vertical direction vd of the machine 3, and more freedom is provided in the positioning of the centrifugal separator 1 onto the machine 3.

However, according to further embodiments of the present disclosure, the centrifugal separator 1 may be connected to the machine 3 such that a rotation axis ra of the centrifugal rotor of the centrifugal separator 1 is transversal to the horizontal plane hp when the machine 3 is oriented in the upright use position. As an example, the centrifugal separator 1 may be connected to the machine 3 such that a rotation axis ra of the centrifugal rotor of the centrifugal separator 1 is substantially parallel to the vertical direction vd when the machine 3 is oriented in the upright use position.

The wording "substantially parallel to", as used herein, may encompass that the angle between the objects referred to is less than 7 degrees.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A centrifugal separator configured to separate liquid and solid particles from a flow of gas generated by a machine, wherein the centrifugal separator comprises a centrifugal rotor; a hydraulic drive arrangement configured to rotate the centrifugal rotor; a hydraulic connection for connecting the hydraulic drive arrangement to a hydraulic circuit of the machine; a connecting portion, comprising a protrusion to be inserted into a connecting aperture of the machine, for connecting the centrifugal separator to the machine, wherein the hydraulic connection is arranged on the connecting portion.

2. The centrifugal separator according to claim 1, wherein the connecting portion of the centrifugal separator is substantially cylindrical, substantially conical, or comprises a cylindrical and a conical portion.

3. The centrifugal separator according to claim 1, wherein the connecting portion of the centrifugal separator comprises a groove, and wherein the hydraulic connection is arranged in the groove.

4. The centrifugal separator according to claim 3, wherein the groove extends along more than 50% of a circumference of the connecting portion.

5. The centrifugal separator according to claim 3, wherein the connecting portion comprises at least one sealing on each side of the groove.

6. The centrifugal separator according to claim 1, wherein a centre axis of the connecting portion is substantially parallel to a rotation axis of the centrifugal rotor.

7. The centrifugal separator according to claim 1, wherein a centre axis of the connecting portion is substantially coaxial with a rotation axis of the centrifugal rotor.

8. The centrifugal separator according to claim 1, wherein the hydraulic drive arrangement comprises a turbine connected to the centrifugal rotor and a first nozzle configured to eject a liquid onto the turbine.

9. The centrifugal separator according to claim 8, wherein the hydraulic drive arrangement comprises at least a second nozzle configured to eject a liquid onto the turbine.

10. The centrifugal separator according to claim 1, wherein the centrifugal separator is configured to be connected to the machine such that a rotation axis of the centrifugal rotor is substantially parallel to a horizontal plane when the machine is oriented in an upright use position.

11. The centrifugal separator according to claim 1, wherein the centrifugal separator further comprises a return conduit configured to return liquid and solid particles separated by the centrifugal rotor to the hydraulic circuit of the machine, and wherein the return conduit is arranged below a rotation axis of the centrifugal rotor when the centrifugal separator is in operation.

12. The centrifugal separator according to claim 11, wherein the return conduit is arranged below an outer periphery of the centrifugal rotor when the centrifugal separator is in operation.

13. The centrifugal separator according to claim 11, wherein the return conduit is formed as a slot.

14. The centrifugal separator according to claim 11, wherein the centrifugal separator further comprises a separator housing, and wherein the return conduit is arranged in the separator housing.

15. The centrifugal separator according to claim 11, wherein the return conduit comprises a one-way valve.

16. The centrifugal separator according to claim 1, wherein the centrifugal rotor comprises a stack of frusto-conical separation discs configured to separate liquid and solid particles from the flow of gas generated by the machine during rotation of the centrifugal rotor.

17. The centrifugal separator according to claim 1, wherein the machine is an internal combustion engine, and wherein the centrifugal separator is configured to separate liquid and solid particles from a flow of crankcase gases generated by the internal combustion engine.

18. A machine configured to generate a flow of gas, wherein the machine comprises: a connecting aperture; a hydraulic circuit connected to the connecting aperture; and a centrifugal separator configured to separate liquid and solid particles from the flow of gas generated by the machine, and wherein the centrifugal separator comprises: a connecting portion, comprising a protrusion to be inserted into the connecting aperture, for connecting the centrifugal separator to the machine; a centrifugal rotor; a hydraulic drive arrangement configured to rotate the centrifugal rotor; and a hydraulic connection arranged on the connecting portion, and wherein the hydraulic connection connects the hydraulic drive arrangement to the hydraulic circuit of the machine.

19. The machine according to claim 18, wherein the connecting aperture of the machine and the connecting portion of the centrifugal separator together form a connection interface, wherein the connection interface comprises a groove, and wherein the hydraulic connection is fluidly connected to the groove.

20. The machine according to claim 19, wherein the connection interface comprises at least one sealing on each side of the groove.

21. The machine according to claim 18, wherein the machine is an internal combustion engine, and wherein the centrifugal separator is configured to separate liquid and solid particles from a flow of crankcase gases generated by the internal combustion engine.

* * * * *